United States Patent
Fan et al.

(10) Patent No.: US 10,250,490 B2
(45) Date of Patent: Apr. 2, 2019

(54) METHOD AND NETWORK NODE FOR ROUTING BACKHAUL PACKETS

(71) Applicant: Telefonaktiebolaget LM Ericsson (publ), Stockholm (SE)

(72) Inventors: Rui Fan, Beijing (CN); Zhiheng Guo, Beijing (CN); Hai Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 204 days.

(21) Appl. No.: 15/039,590

(22) PCT Filed: Dec. 23, 2013

(86) PCT No.: PCT/CN2013/090239
§ 371 (c)(1),
(2) Date: May 26, 2016

(87) PCT Pub. No.: WO2015/096008
PCT Pub. Date: Jul. 2, 2015

(65) Prior Publication Data
US 2017/0041218 A1    Feb. 9, 2017

(51) Int. Cl.
*H04L 12/721* (2013.01)
*H04W 40/02* (2009.01)
*H04W 16/32* (2009.01)
*H04W 64/00* (2009.01)
*H04W 76/12* (2018.01)
*H04W 88/04* (2009.01)
(Continued)

(52) U.S. Cl.
CPC ............. *H04L 45/26* (2013.01); *H04W 16/32* (2013.01); *H04W 40/02* (2013.01); *H04W 64/00* (2013.01);
(Continued)

(58) Field of Classification Search
None
See application file for complete search history.

(56) References Cited

U.S. PATENT DOCUMENTS

2010/0046418 A1*  2/2010  Horn ............... H04W 40/22
                                                     370/315
2010/0103862 A1*  4/2010  Ulupinar ......... H04L 29/12207
                                                     370/315
(Continued)

FOREIGN PATENT DOCUMENTS

CN    102132606 A    7/2011
WO    2010079984 A2  7/2010

OTHER PUBLICATIONS

3GPP ETSI TS 136 413 v12.3.0 (Sep. 2014) LTE; Evovled Universal Terrestrial Radio Access Network (E-UTRAN) S1 Application Protocol (S1-AP) (3GPP TS 36.413 version 12.3.0 Release 12) Year 2014.*
(Continued)

*Primary Examiner* — Jamaal R Henson
(74) *Attorney, Agent, or Firm* — Withrow & Terranova, PLLC

(57) ABSTRACT

The disclosure provides a method and a radio access network node for routing backhaul packets. The method comprises: forwarding to a core network node an attach request originated from a User Equipment (UE); receiving from the core network node a response message indicating that the UE is a backhaul UE, the response message containing an attach response destined to the UE; and routing, upon receiving an Internet Protocol (IP) packet from the UE, the IP packet based on a destination IP address of the IP packet.

10 Claims, 9 Drawing Sheets

(51) Int. Cl.
  *H04W 76/02* (2009.01)
  *H04J 11/00* (2006.01)
  *H04L 29/12* (2006.01)
  *H04W 88/02* (2009.01)

(52) U.S. Cl.
  CPC ........... *H04J 11/00* (2013.01); *H04L 61/6068* (2013.01); *H04W 76/022* (2013.01); *H04W 76/12* (2018.02); *H04W 88/02* (2013.01); *H04W 88/04* (2013.01)

(56) References Cited

U.S. PATENT DOCUMENTS

| | | | | |
|---|---|---|---|---|
| 2010/0260096 | A1* | 10/2010 | Ulupinar | H04B 7/2606 370/315 |
| 2011/0044279 | A1* | 2/2011 | Johansson | H04W 92/20 370/329 |
| 2012/0140697 | A1* | 6/2012 | Chen | H04W 28/06 370/315 |

OTHER PUBLICATIONS

Author Unknown, "3rd Generation Partnership Project; Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.2.0, Sep. 2013, 293 pages.

International Search Report and Written Opinion for International Patent Application No. PCT/CN2013/090239, dated Sep. 26, 2014, 17 pages.

* cited by examiner

METHOD AND NETWORK NODE FOR ROUTING BACKHAUL PACKETS

This application is a 35 U.S.C. § 371 national phase filing of International Application No. PCT/CN2013/090239, filed Dec. 23, 2013, the disclosure of which is incorporated herein by reference in its entirety.

TECHNICAL FIELD

The disclosure relates to communication technology, and more particularly, to a method and network node for routing backhaul packets.

BACKGROUND

With the evolution of wireless communication systems, there is an increasing demand for larger coverage, higher capacity and higher data transmission rate. Currently, a solution to satisfy this demand is to deploy pico cells. However, in many cases it is a difficult to establish a backhaul link between a pico Base Station (BS) and its associated core network (CN) by paving an optical fiber or providing a Line of Sight (LOS) radio link between them. Moreover, since there are different wireless communication systems with different radio access technologies co-existing in the market, such as Global System for Mobile Communication (GSM), Wideband Code Division Multiple Access (WCDMA) and Long Term Evolution (LTE), it is very expensive to establish dedicated backhaul links for each of these systems.

Therefore, an LTE-based non-LOS wireless backhaul solution has attracted more and more attention from telecommunication operators. According to this solution, a backhaul User Equipment (UE) and a backhaul evolved NodeB (eNB) are introduced for establishing a wireless backhaul link. As shown in FIG. 1, a backhaul UE is an LTE terminal connected with a pico BS via a wired connection (e.g., Ethernet connection) and acts as a wireless router for receiving backhaul packets (e.g., Internet Protocol (IP) packets) from the pico BS and forwarding them to a backhaul eNB via a radio link. The backhaul eNB then forwards the backhaul packets to a core network node. A backhaul eNB may also act as an ordinary eNB serving ordinary UEs in its cell.

However, there is a problem with the above wireless backhaul solution. As shown in FIG. 1, in the prior art, upon receiving a backhaul IP packet from the backhaul UE, the backhaul eNB simply encapsulates the IP packet into a General Packet Radio Service (GPRS) Tunnel Protocol (GTP) packet and sends it to an LTE Gateway (GW), which can be a Serving GW (S-GW) or Packet Data Network (PDN) GW (PDN-GW) in an LTE core network, across an LTE transport network.

The GW then decapsulates the GTP packet to obtain the IP packet and sends the IP packet to its destination. However, usually the IP packet from the pico BS is destined to a core network node that is not located in the LTE core network, e.g., a GSM core network node. In this case, the routing of the backhaul packet is inefficient since it unnecessarily travels through the entire LTE transport network even if its destination node is geographically or topologically close to the backhaul eNB. This causes unnecessary burden on the LTE transport and core networks. The dashed lines with arrows in FIG. 1 illustrate the path the packet needs to travel through before it finally reaches its destination.

The 3$^{rd}$ Generation Partner Project (3GPP) TS 23.401 v12.2.0 discloses a technique known as Selected IP Traffic Offloading (SIPTO). According to this technique, based on Access Point Name (APN) or UE identifier (ID) information transmitted from a UE, a Mobility Management Entity (MME) in the LTE core network selects a GW (S-GW or PDN-GW) that is physically close to an eNB serving the UE. The MME notifies the eNB of the selected GW and then the eNB can send packets originated from the UE to the selected GW which is close to it.

However, the SIPTO technique is based on a Domain Name System (DNS) mechanism in the MME, which is complicated. The traditional DNS mechanism needs to be enhanced with topological and/or geographical information such that the MME can determine which GW is close to the eNB according to Full Qualified Domain Name (FQDN). Moreover, it is not trivial to maintain such topological and/or geographical information in the DNS mechanism due to dynamics of the UE and the large number of UEs and eNBs in the network.

Therefore, there is a need for an improved solution for routing backhaul packets efficiently.

SUMMARY

It is an object of the disclosure to provide methods and network nodes, as well as associated computer programs and computer program products, capable of routing backhaul packets efficiently without placing much burden on core network nodes.

According to a first aspect of the disclosure, a method in a radio access network node for routing backhaul packets is provided. The method comprises: forwarding to a core network node an attach request originated from a User Equipment (UE); receiving from the core network node a response message indicating that the UE is a backhaul UE, the response message containing an attach response destined to the UE; and routing, upon receiving an Internet Protocol (IP) packet from the UE, the IP packet based on a destination IP address of the IP packet.

In an embodiment, the response message contains a predetermined gateway IP address for indicating that the UE is a backhaul UE.

In an embodiment, the attach request contains an identifier associated with the UE and the response message is generated based on the identifier.

In an embodiment, the radio access network node is an evolved NodeB (eNB) and the core network node is a Mobility Management Entity (MME).

According to a second aspect of the disclosure, a radio access network node is provided. The radio access network node comprises a transceiver, a processor and a memory, said memory containing instructions executable by said processor whereby said radio access network node is operative to: forward to a core network node an attach request originated from a User Equipment (UE); receive from the core network node a response message indicating that the UE is a backhaul UE, the response message containing an attach response destined to the UE; and route, upon receiving an Internet Protocol (IP) packet from the UE, the IP packet based on a destination IP address of the IP packet.

According to a third aspect of the disclosure, a computer program is provided. The computer program comprises computer readable instructions which, when run on a radio access network node, cause the radio access network node to: forward to a core network node an attach request originated from a User Equipment (UE); receive from the core network node a response message indicating that the UE is a backhaul UE, the response message containing an attach response destined to the UE; and route, upon receiving an Internet Protocol (IP) packet from the UE, the IP packet based on a destination IP address of the IP packet.

According to a fourth aspect of the disclosure, a computer program product is provided. The computer program product comprises computer readable storage means storing the computer program according to the above third aspect.

According to a fifth aspect of the disclosure, a method in an intermediate network node for routing backhaul packets is provided. The intermediate network node is located between a radio access network node and a core network. The method comprises: forwarding to a core network node an attach request originated from a User Equipment (UE); receiving from the core network node a response message indicating that the UE is a backhaul UE, the response message containing an attach response destined to the UE; modifying the response message by setting a gateway (GW) Internet Protocol (IP) address in the response message to an IP address of the intermediate network node and transmitting the modified response message to the radio access network node; decapsulating, upon receiving a GPRS Tunnel Protocol (GTP) packet from the radio access network node, the GTP packet to obtain an IP packet contained in the GTP packet; determining that the IP packet is originated from the UE; and routing the IP packet based on a destination IP address of the IP packet.

In an embodiment, the response message received from the core network node contains a predetermined gateway IP address for indicating that the UE is a backhaul UE.

In an embodiment, the attach request contains an identifier associated with the UE and the response message is generated based on the identifier.

In an embodiment, said determining comprises: obtaining an S1 Application Protocol (S1AP) identifier associated with the UE from the response message received from the core network node; allocating a GTP Tunnel Identifier (TEID) for the S1AP identifier; and determining that the IP packet is originated from the UE when a GTP TEID contained in the GTP packet matches the allocated GTP TEID.

In an embodiment, the radio access network node is an evolved NodeB (eNB) and the core network node is a Mobility Management Entity (MME).

According to a sixth aspect of the disclosure, an intermediate network node is provided. The intermediate network node is located between a radio access network node and a core network and comprises a transceiver, a processor and a memory, said memory containing instructions executable by said processor whereby said intermediate network node is operative to: forward to a core network node an attach request originated from a User Equipment (UE); receive from the core network node a response message indicating that the UE is a backhaul UE, the response message containing an attach response destined to the UE; modify the response message by setting a gateway (GW) Internet Protocol (IP) address in the response message to an IP address of the intermediate network node and transmit the modified response message to the radio access network node; decapsulate, upon receiving a GPRS Tunnel Protocol (GTP) packet from the radio access network node, the GTP packet to obtain an IP packet contained in the GTP packet; determine that the IP packet is originated from the UE; and route the IP packet based on a destination IP address of the IP packet.

According to a seventh aspect of the disclosure, a computer program is provided. The computer program comprises computer readable instructions which, when run on an intermediate network node located between a radio access network node and a core network, cause the intermediate network node to: forward to a core network node an attach request originated from a User Equipment (UE); receive from the core network node a response message indicating that the UE is a backhaul UE, the response message containing an attach response destined to the UE; modify the response message by setting a gateway (GW) Internet Protocol (IP) address in the response message to an IP address of the intermediate network node and transmit the modified response message to the radio access network node; decapsulate, upon receiving a GPRS Tunnel Protocol (GTP) packet from the radio access network node, the GTP packet to obtain an IP packet contained in the GTP packet; determine that the IP packet is originated from the UE; and route the IP packet based on a destination IP address of the IP packet.

According to an eighth aspect of the disclosure, a computer program product is provided. The computer program product comprises computer readable storage means storing the computer program according to the above seventh aspect.

According to a ninth aspect of the disclosure, a method in a core network node is provided. The method comprises: receiving an attach request from another network node, the attach request being originated from a User Equipment (UE) and containing an identifier associated with the UE; determining that the UE is a backhaul UE based on the identifier; and transmitting a response message to the other network node, the response message containing an attach response destined to the UE, wherein the response message contains a predetermined gateway IP address for indicating to the other network node that the UE is a backhaul UE.

In an embodiment, the core network node is a Mobility Management Entity (MME) and the other network node is an evolved NodeB (eNB) or an intermediate network node between an eNB and its associated core network.

According to a tenth aspect of the disclosure, a core network node is provided. The core network node comprises a transceiver, a processor and a memory, said memory containing instructions executable by said processor whereby said core network node is operative to: receive an attach request from another network node, the attach request being originated from a User Equipment (UE) and containing an identifier associated with the UE; determine that the UE is a backhaul UE based on the identifier; and transmit a response message to the other network node, the response message containing an attach response destined to the UE, wherein the response message contains a predetermined gateway IP address for indicating to the other network node that the UE is a backhaul UE.

According to an eleventh aspect of the disclosure, a computer program is provided. The computer program comprises computer readable instructions which, when run on a core network node, cause the core network node to: receive an attach request from another network node, the attach request being originated from a User Equipment (UE) and containing an identifier associated with the UE; determine that the UE is a backhaul UE based on the identifier; and transmit a response message to the other network node, the response message containing an attach response destined to the UE, wherein the response message contains a predetermined gateway IP address for indicating to the other network node that the UE is a backhaul UE.

According to a twelfth aspect of the disclosure, a computer program product is provided. The computer program product comprises computer readable storage means storing the computer program according to the above eleventh aspect.

With the embodiments of the disclosure, the radio access network node or the intermediate network node can learn from a response from the core network node whether a UE is a backhaul UE. Then, upon receiving an IP packet originated from a backhaul UE, the radio access network node or the intermediate network node will know that the IP packet is a backhaul packet and route the IP packet directly based on the destination IP address of the IP packet. In this way, the backhaul packet does not need to travel through the entire LTE transport network and be processed at a GW in the core network. Therefore, it is possible to route the backhaul packet efficiently without placing much burden on the core network nodes (MME and GW).

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 2:
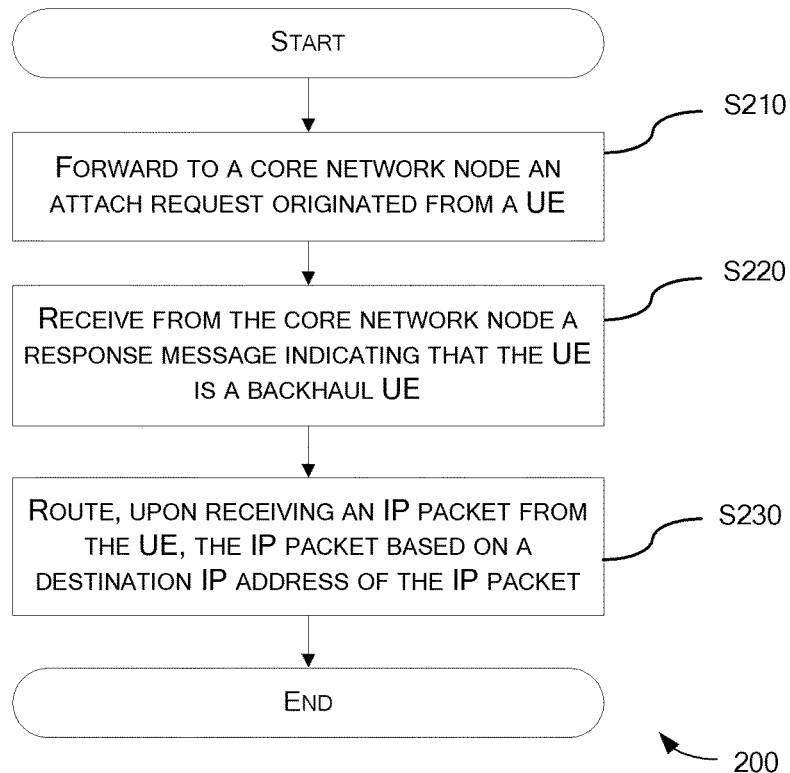
FIG. 2 is a flowchart illustrating a method in a radio access network node for routing backhaul packets according to an embodiment of the disclosure.

FIG. 2 is a flowchart illustrating a method 200 in a radio access network node for routing backhaul packets according to an embodiment of the disclosure. Here the radio access network node can be an evolved NodeB (eNB). The method 200 includes the steps as described below.

At step S210, an attach request originated from a User Equipment (UE) is forwarded to a core network node. Here the core network node can be a Mobility Management Entity (MME). The attach request contains an identifier associated with the UE.

At step S220, a response message is received from the core network node indicating that the UE is a backhaul UE. The response message contains an attach response destined to the UE. The response message is generated based on the identifier associated with the UE as contained in the attach request.

In an example, the attach response contains a predetermined gateway IP address for indicating that the UE is a backhaul UE.

At step S230, when an Internet Protocol (IP) packet is received from the UE, the IP packet is routed based on a destination IP address of the IP packet.

Now the method 200 will be explained in further detail with reference to the sequence chart of FIG. 3.

At 3.1, the backhaul UE sends an attach request to the backhaul eNB. The attach request is a Non-Access Stratum (NAS) message destined to a core network node (an MME in this example) and contains an identifier associated with the UE (also referred to as UE ID hereinafter). Here the identifier can be for example an International Mobile Subscriber Identification (IMSI) number.

At 3.2, upon receiving the attach request, the backhaul eNB forwards the attach request to the MME via an S1 interface. In particular, the backhaul eNB encapsulates the NAS message into an S1 request message for transmission to the MME.

At 3.3, upon receiving the S1 request message containing the attach request, the MME extracts the UE ID from the message and determines whether the UE is a backhaul UE or not based on the extracted UE ID. For example, the MME can maintain a list of UE IDs associated with backhaul UEs and can determine the UE to be a backhaul UE if the UE ID is found in the list. In this example, the MME determines that the UE is a backhaul UE and sends to the backhaul eNB an S1 response message (e.g., an initialContextSetupRequest message) containing an attach response destined to the UE. As an example, the S1 response message contains a predetermined gateway (GW) IP address for indicating to the eNB that the UE is a backhaul UE.

According to the traditional procedure, the eNB stores the GW IP address contained in the S1 response message (e.g., in its routing table). Then, when an IP packet is received from the UE, the eNB will encapsulate the IP packet into a GTP packet and send it to the stored GW IP address. However, according to the disclosure, the predetermined GW IP address can be a special, reserved IP address, such as 127.0.0.1, that does not present an address of a GW in the core network, but only notifies the eNB that the UE is a backhaul UE.

On the other hand, if the MME determines that the UE is not a backhaul UE, it will simply follow the traditional procedure which is irrelevant to the disclosure and will be omitted here.

At 3.4, upon receiving the S1 response message, the backhaul eNB determines from the predetermined GW IP address that the UE is a backhaul UE. The eNB extracts the attach response from the S1 response message and sends the attach response to the UE.

At 3.5, the pica BS sends a backhaul IP packet to the backhaul UE, which then forwards the packet to the backhaul eNB at 3.6.

At 3.7, the backhaul eNB receives the IP packet. Since the eNB is aware that the UE is a backhaul UE, the eNB can determine that the IP packet from the backhaul UE is a backhaul IP packet. Therefore, the eNB routes the IP packet based on a destination IP address of the IP packet. That is, the eNB routes the IP packet to its destination directly, without sending it to a GW in the core network.

Figure 1:
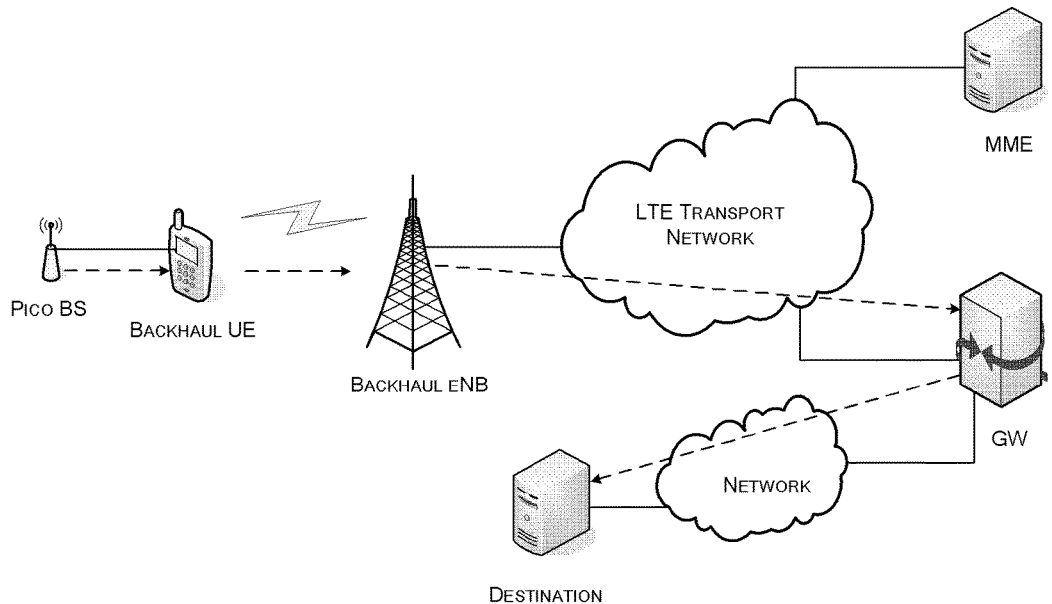
FIG. 1 shows a scenario of packet transmission according to the prior art.
Figure 4:
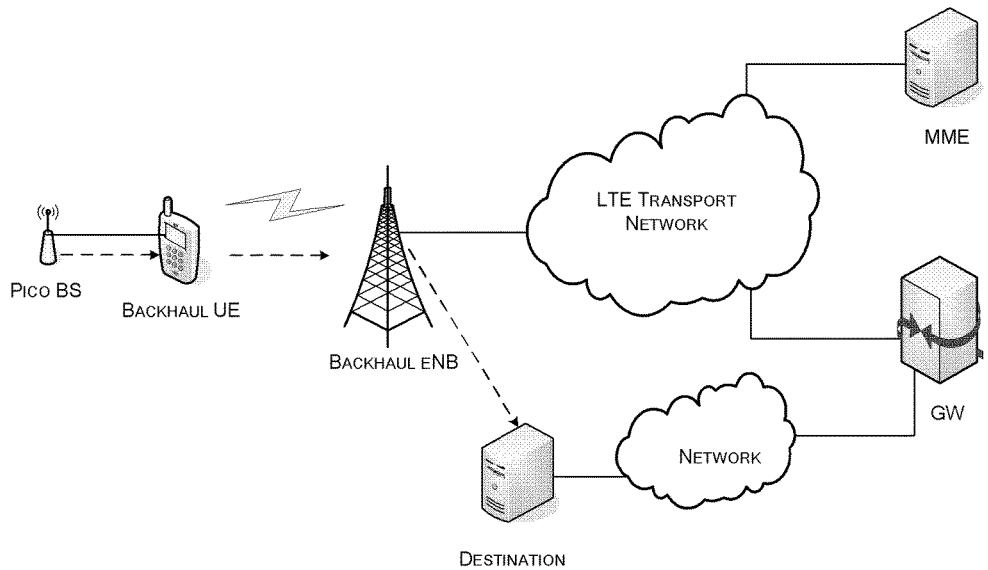
FIG. 4 shows a scenario of packet transmission according to the method shown in FIG. 2.

FIG. 4 shows a scenario of packet transmission according to the above method 200. The dashed lines with arrows in FIG. 4 illustrate the transmission path of a backhaul IP packet. It can be seen that, in contrast to the scenario shown in FIG. 1, the backhaul IP packet is routed directly to its destination by the backhaul eNB, without traveling through the entire LTE transport network.

Figure 5:
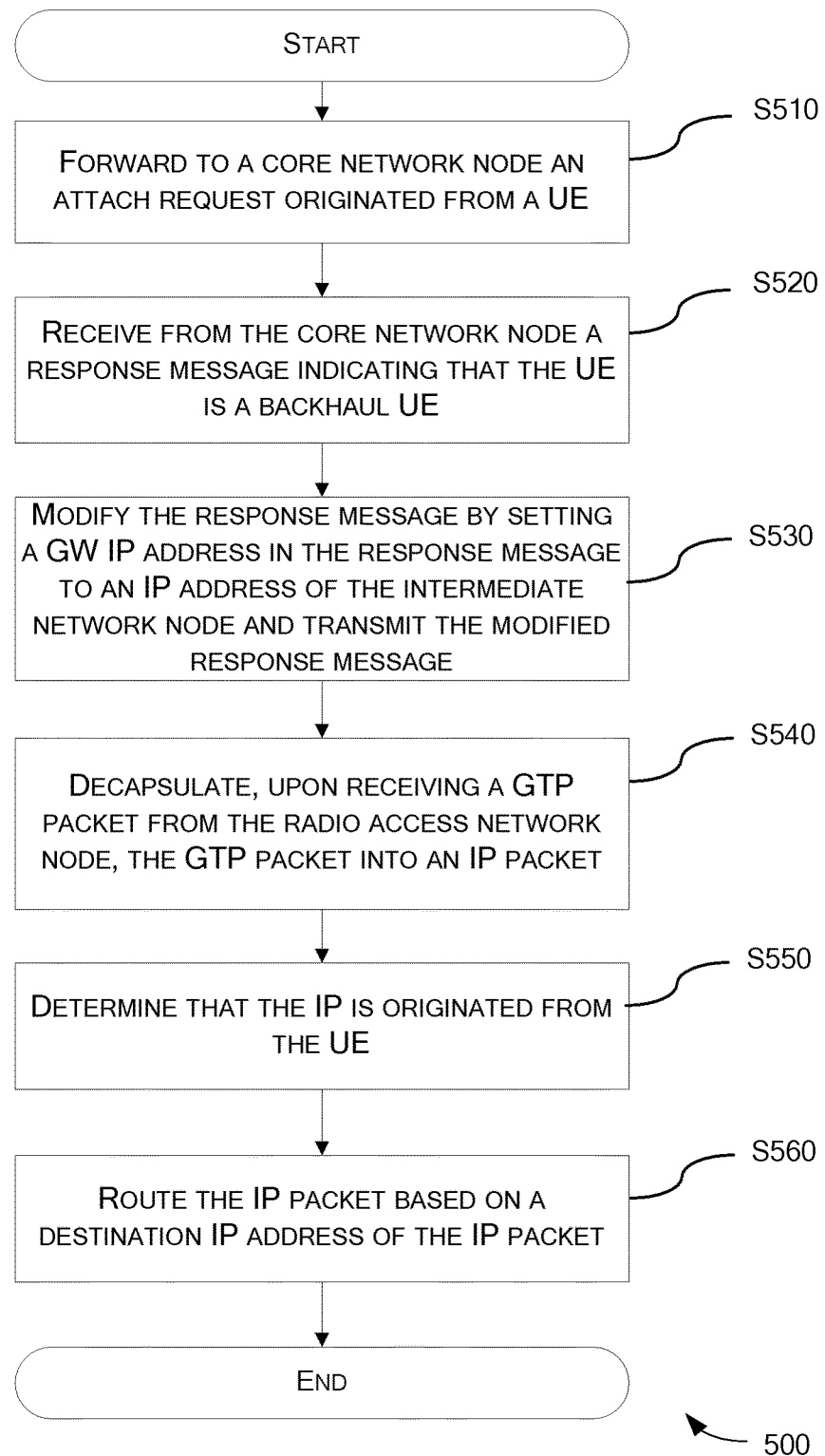
FIG. 5 is a flowchart illustrating a method in an intermediate network node for routing backhaul packets according to an embodiment of the disclosure.

FIG. 5 is a flowchart illustrating a method 500 in an intermediate network node for routing backhaul packets according to an embodiment of the disclosure. The intermediate network node is located between a radio access network node (e.g., an eNB) and a core network. The method includes the steps as described below.

At step S510, an attach request originated from a User Equipment (UE) is forwarded to a core network node. Here the core network node can be a Mobility Management Entity (MME). The attach request contains an identifier associated with the UE.

At step S520, a response message indicating that the UE is a backhaul UE is received from the core network node. The response message contains an attach response destined to the UE. Here, the response message received from the core network node may contain a predetermined gateway IP address for indicating that the UE is a backhaul UE. The response message is generated based on the identifier associated with the UE as contained in the attach request.

At step S530, the response message is modified by setting a gateway (GW) Internet Protocol (IP) address in the response message to an IP address of the intermediate network node and the modified response message is transmitted to the radio access network node.

At step S540, when a GPRS Tunnel Protocol (GTP) packet is received from the radio access network node, the GTP packet is decapsulated to obtain an IP packet contained in the GTP packet.

At step S550, it is determined that the IP packet is originated from the UE.

In an embodiment, an S1 Application Protocol (S1AP) identifier associated with the UE is obtained from the response message received from the core network node. A GTP Tunnel Identifier (TEID) is allocated for the S1AP identifier. In the step S550, it is determined that the IP packet is originated from the UE when a GTP TEID contained in the GTP packet matches the allocated GTP TEID.

At step S560, the IP packet is routed based on a destination IP address of the IP packet.

Now the method 500 will be explained in further detail with reference to the sequence chart of FIG. 6.

At 6.1, the backhaul UE sends an attach request to the backhaul eNB. As described above in conjunction with FIG. 3, the attach request is a NAS message destined to a core network node (an MME in this example) and contains an identifier associated with the UE (also referred to as UE ID hereinafter). Here the identifier can be for example an IMSI number.

At 6.2, upon receiving the attach request, the backhaul eNB forwards the attach request to the intermediate network node via an S1 interface. In particular, the backhaul eNB encapsulates the NAS message into an S1 request message for transmission to the intermediate network node. Here, another identifier is allocated for the UE at the backhaul eNB, known as eNB UE S1 Application Protocol (S1AP) ID (also referred to as S1AP ID hereinafter). The S1AP ID is included in the S1 request message. Then, the intermediate network node simply forwards the S1 request message to the MME.

At 6.3, upon receiving the S1 request message, the MME extracts the UE ID from the message and determines whether the UE is a backhaul UE or not based on the extracted UE ID. In this example, the MME determines that the UE is a backhaul UE and sends to the intermediate network node an S1 response message (e.g., an initialContextSetupRequest message) containing an attach response destined to the UE. As an example, the S1 response message contains a predetermined GW IP address for indicating to the eNB that the UE is a backhaul UE. Here, the predetermined GW IP address can be a special, reserved IP address, such as 127.0.0.1, that does not present an address of a GW in the core network, but only notifies the eNB that the UE is a backhaul UE. The S1 response message also contains the S1AP ID associated with the UE.

At 6.4, upon receiving the S1 response message, the intermediate network node determines from the predetermined GW IP address that the UE is a backhaul UE. The intermediate network node modifies the S1 response message by setting a gateway IP address in the S1 response message to an IP address of the intermediate network node itself and sends the modified S1 response message to the backhaul eNB.

At 6.5, the eNB simply follows the traditional procedure, i.e., storing the GW IP address contained in the S1 response message (which is now in fact the IP address of the intermediate network node) in its routing table. Additionally, the eNB extracts the attach response from the S1 response message and sends the attach response to the UE.

At 6.6, the pica BS sends a backhaul IP packet to the backhaul UE, which then forwards the packet to the backhaul eNB at 6.7.

At 6.8, upon receiving the IP packet, the backhaul eNB follows the traditional procedure, i.e., encapsulating the IP packet into a GTP packet and sending it to the GW IP address stored at 6.5 (i.e., the IP address of the intermediate network node).

At 6.9, upon receiving the GPT packet, the intermediate network node decapsulates the GTP packet to obtain the IP packet contained in the GTP packet and determines that the IP packet is originated from the UE. As described above, the intermediate network node can obtain the S1AP ID associated with the UE the S1 response message received from the MME and allocates a unique GTP Tunnel Identifier (TEID) for the S1AP ID. Therefore, when a GTP TEID contained in the GTP packet matches the allocated GTP TEID, the intermediate network node can determine that the IP packet is originated from the UE. Since the intermediate network node is aware that the UE is a backhaul UE, the intermediate network node can determine that the IP packet from the backhaul UE is a backhaul IP packet. Hence, the intermediate network node routes the IP packet based on a destination IP address of the IP packet. That is, the intermediate network node routes the IP packet to its destination directly, without sending it to a GW in the core network.

It can be seen that, with the introduction of the intermediate network node, the eNB simply follows the traditional procedure and let the intermediate network node handle the routing of the backhaul packets.

Figure 7:
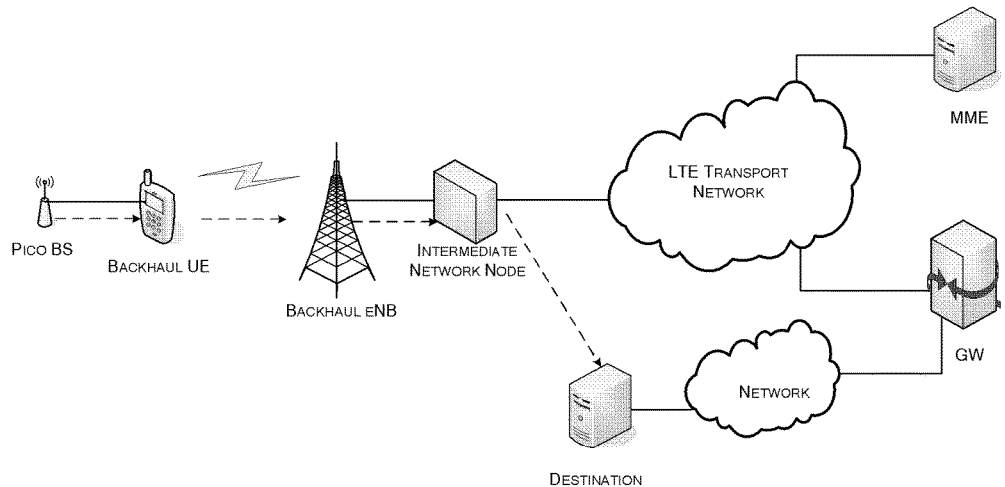
FIG. 7 shows a scenario of packet transmission according to the method shown in FIG. 5.

FIG. 7 shows a scenario of packet transmission according to the above method 500. The dashed lines with arrows in FIG. 7 illustrate the transmission path of a backhaul IP packet. It can be seen that, in contrast to the scenario shown in FIG. 1, the backhaul IP packet is routed directly to its destination by the intermediate network node, without traveling through the entire LTE transport network.

Figure 8:
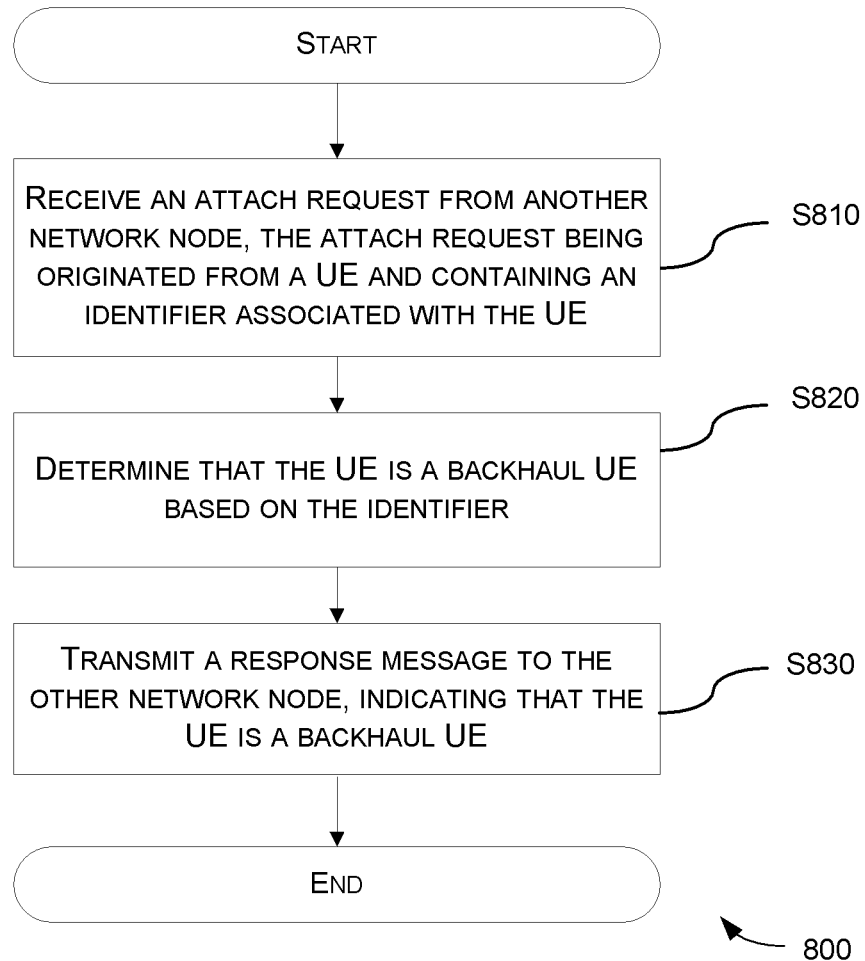
FIG. 8 is a flowchart illustrating a method in a core network node according to an embodiment of the disclosure.

FIG. 8 is a flowchart illustrating a method 800 in a core network node according to an embodiment of the disclosure. The core network node can be a Mobility Management Entity (MME). The method 800 includes the steps as described below.

At step S810, an attach request is received from another network node. The attach request is originated from a User Equipment (UE) and contains an identifier associated with the UE. Here the other network node can be an eNB or an intermediate network node between an eNB and its associated core network.

At step S820, it is determined that the UE is a backhaul UE based on the identifier.

At step S830, a response message is transmitted to the other network node. The response message contains an attach response destined to the UE. The response message contains a predetermined gateway IP address for indicating to the other network node that the UE is a backhaul UE.

Figure 3:
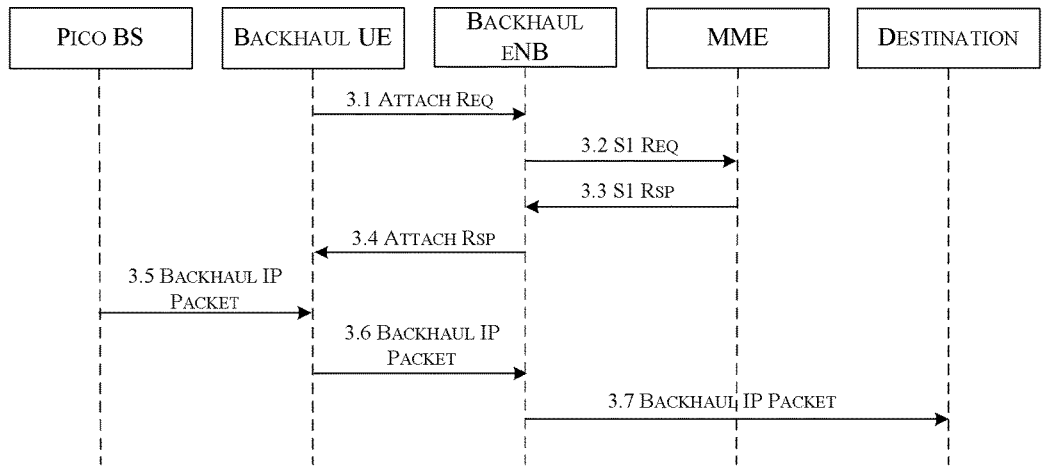
FIG. 3 is a sequence chart explaining the method shown in FIG. 2.
Figure 6:
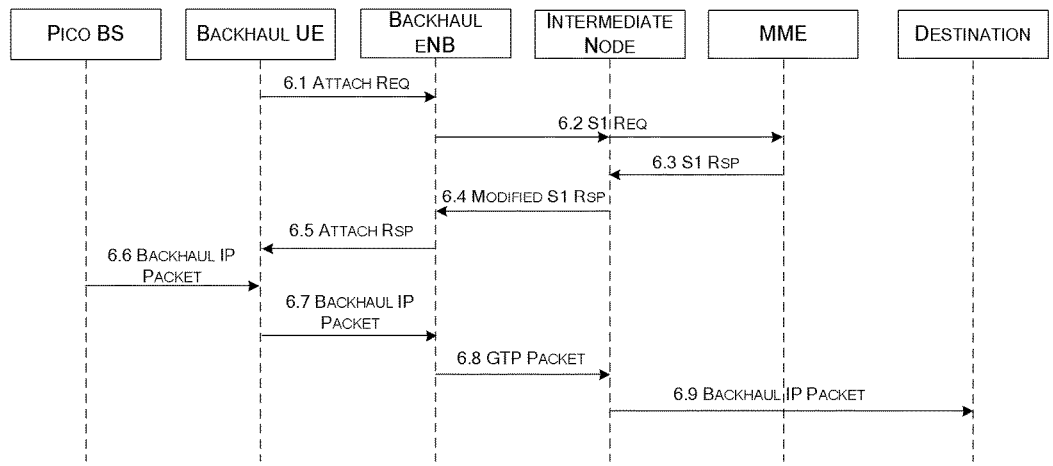
FIG. 6 is a sequence chart explaining the method shown in FIG. 5.

The details of the above steps S810, S820 and S830 have been explained in conjunction with the steps 3.1-3.3 in FIGS. 3 and 6.1-6.3 in FIG. 6 and will thus be omitted here.

Figure 9:
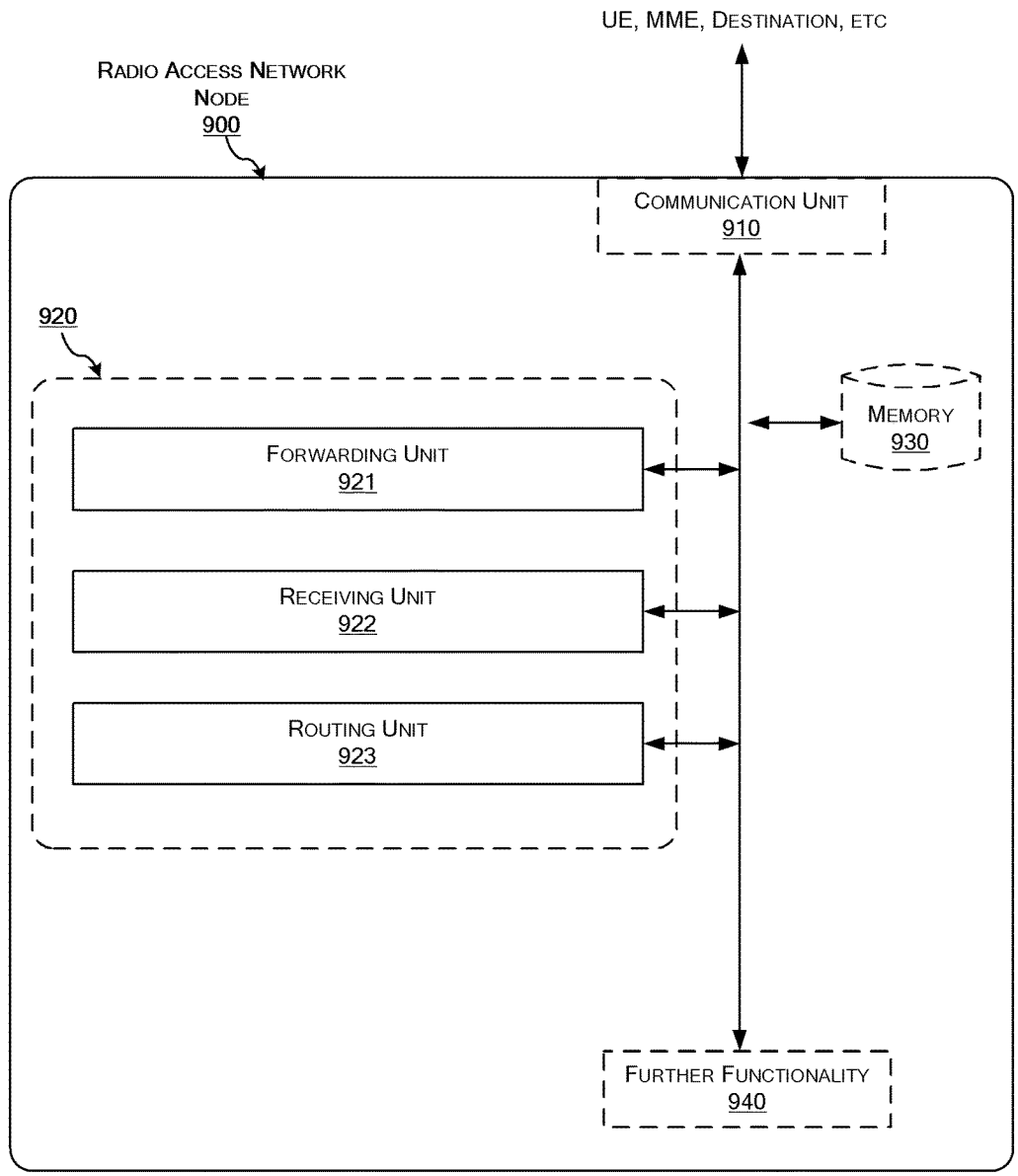
FIG. 9 is a schematic diagram of a radio access network node according to an embodiment of the disclosure.

FIG. 9 is a schematic diagram of a radio access network node (e.g., eNB) 900 according to an embodiment of the disclosure As shown in FIG. 9, the radio access network node 900 includes a communication unit 910 for communicating with other entities such as a UE and an MME. The radio access network node 900 further includes an arrangement 920 for implementing the method described above with reference to FIG. 2. The radio access network node 900 may further comprise one or more memories 930 and one or more further functional units 940, such as functional units providing regular eNB functions.

The arrangement 920 can be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2. The arrangement 920 may be implemented and/or described as follows.

Referring to FIG. 9, the radio access network node 900 includes a forwarding unit 921 that forwards to a core network node (e.g., MME) an attach request originated from a UE.

The radio access network node 900 further includes a receiving unit 922 that receives from the core network node a response message indicating that the UE is a backhaul UE. The response message contains an attach response destined to the UE The radio access network node 900 further includes a routing unit 923 that routes, upon receiving an IP packet from the UE, the IP packet based on a destination IP address of the IP packet.

In an embodiment, the response message contains a predetermined gateway IP address for indicating that the UE is a backhaul UE.

In an embodiment, the attach request contains an identifier associated with the UE and the response message is generated based on the identifier.

Figure 10:
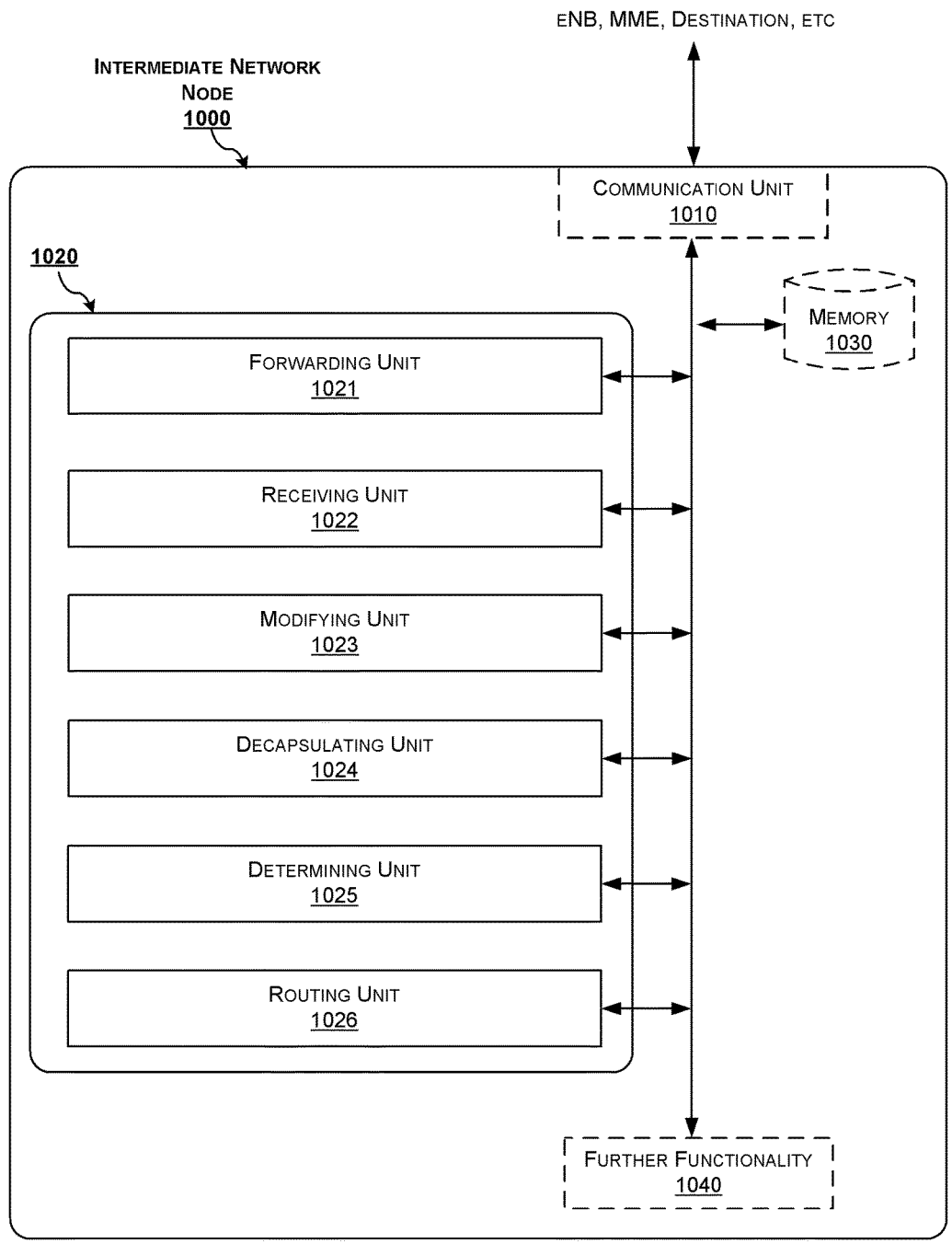
FIG. 10 is a schematic diagram of an intermediate network node according to an embodiment of the disclosure.

FIG. 10 is a schematic diagram of an intermediate network node 1000 according to an embodiment of the disclosure.

As shown in FIG. 10, the intermediate network node 1000 includes a communication unit 1010 for communicating with other entities such as an eNB and an MME. The intermediate network node 1000 further includes an arrangement 1020 for implementing the method described above with reference to FIG. 5. The intermediate network node 1000 may further comprise one or more memories 1030 and one or more further functional units 1040.

The arrangement 1020 can be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 5. The arrangement 1020 may be implemented and/or described as follows.

Referring to FIG. 10, the intermediate network node 1000 includes a forwarding unit that forwards to a core network node (e.g., MME) an attach request originated from a UE.

The intermediate network node 1000 further includes a receiving unit 1022 that receives from the core network node a response message indicating that the UE is a backhaul UE. The response message contains an attach response destined to the UE.

The intermediate network node 1000 further includes a modifying unit 1023 that modifies the response message by setting a gateway (GW) IP address in the response message to an IP address of the intermediate network node and transmits the modified response message to a radio access network node (e.g., eNB).

The intermediate network node 1000 further includes a decapsulating unit 1024 that decapsulates, upon receiving a GPRS Tunnel Protocol (GTP) packet from the radio access network node, the GTP packet to obtain an IP packet contained in the GTP packet.

The intermediate network node 1000 further includes a determining unit 1025 that determines that the IP packet is originated from the UE.

The intermediate network node 1000 further includes a routing unit 1026 that routes the IP packet based on a destination IP address of the IP packet.

In an embodiment, the response message received from the core network node contains a predetermined gateway IP address for indicating that the UE is a backhaul UE.

In an embodiment, the attach request contains an identifier associated with the UE and the response message is generated based on the identifier.

In an embodiment, the determining unit 1025 is configured to: obtain an S1 Application Protocol (S1AP) identifier associated with the UE from the response message received from the core network node; allocate a GTP Tunnel Identifier (TEID) for the S1AP identifier; and determine that the IP packet is originated from the UE when a GTP TEID contained in the GTP packet matches the allocated GTP TEID.

Figure 11:
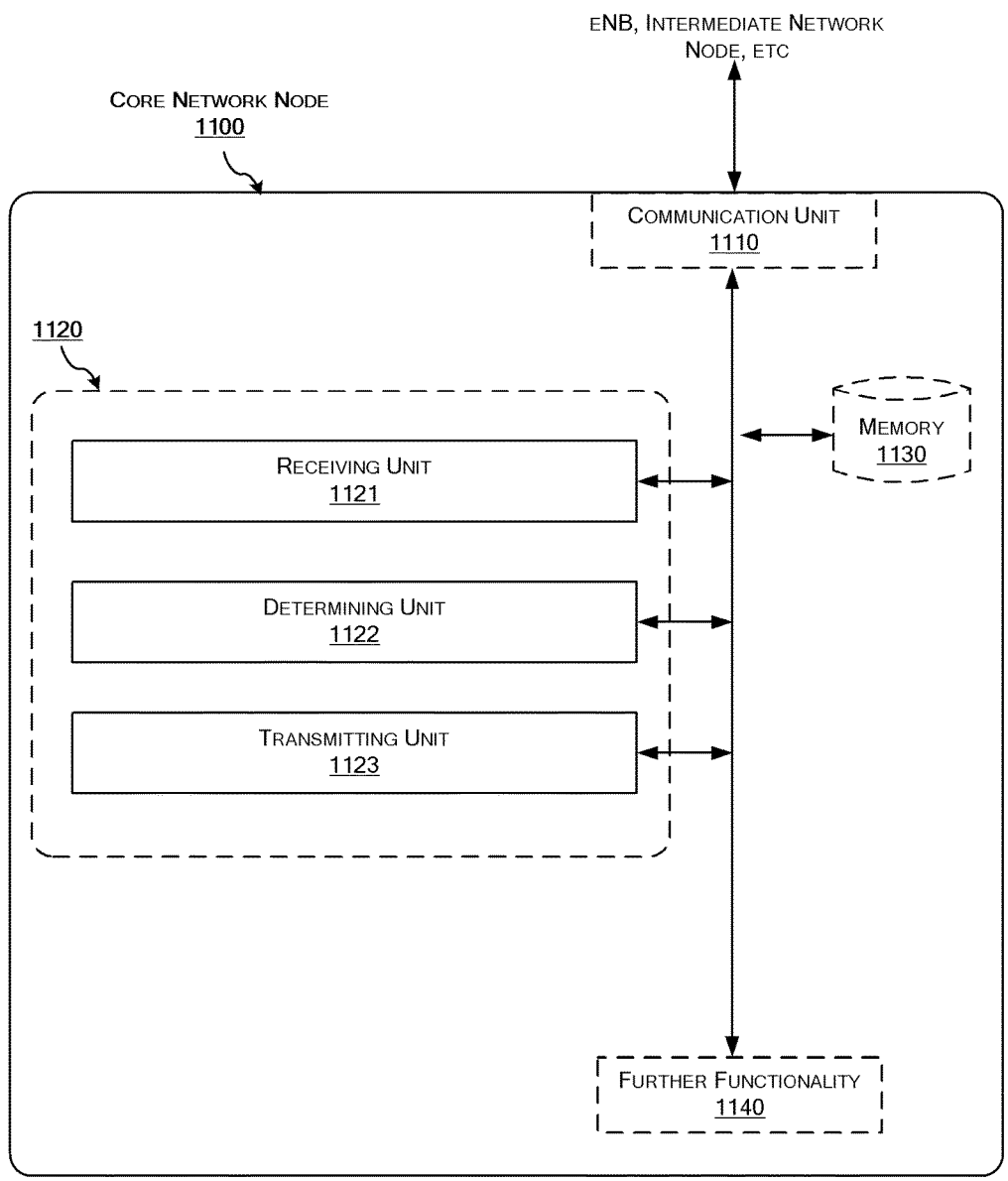
FIG. 11 is a schematic diagram of a core network node according to an embodiment of the disclosure.

FIG. 11 is a schematic diagram of a core network node 1100 according to an embodiment of the disclosure.

As shown in FIG. 11, the core network node 1000 includes a communication unit 1110 for communicating with other entities such as an eNB and an intermediate network node. The intermediate network node 1100 further includes an arrangement 1120 for implementing the method described above with reference to FIG. 8. The intermediate network node 1100 may further comprise one or more memories 1130 and one or more further functional units 1140.

The arrangement 1120 can be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 8. The arrangement 1120 may be implemented and/or described as follows.

Referring to FIG. 11, the core network node 1100 includes a receiving unit 1121 that receives an attach request from another network node (e.g., the eNB 900 or the intermediate network node 1000). The attach request is originated from a UE and contains an identifier associated with the UE.

The core network node 1100 further includes a determining unit 1122 that determines that the UE is a backhaul UE based on the identifier.

The core network node 1100 further includes a transmitting unit 1123 that transmits a response message to the other network node. The response message contains an attach response destined to the UE. The response message contains a predetermined gateway IP address for indicating to the other network node that the UE is a backhaul UE.

Figure 12:
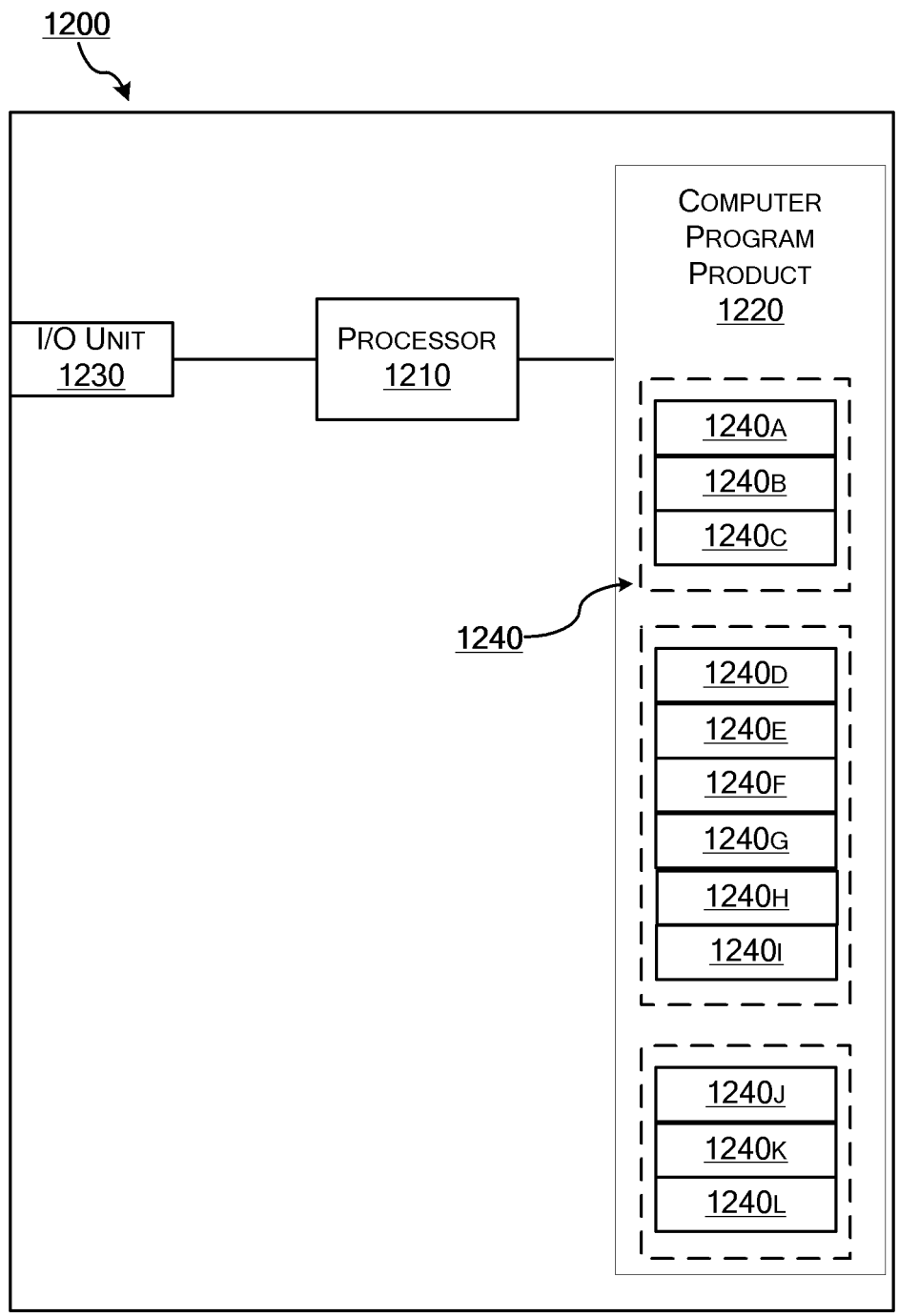
FIG. 12 is a schematic diagram of an arrangement that can be used in the radio access network node, the intermediate network node or the core network node according to an embodiment of the disclosure.

FIG. 12 shows an embodiment of an arrangement 1200 which may be used in the radio access network node 900, the intermediate network node 1000 or the core network node 1100. The arrangement 1200 includes a processor 1210, e.g., a Digital Signal Processor (DSP). The processor 1210 may be a single unit or a plurality of units to perform different actions of procedures described herein. The arrangement 1200 may also comprise an input/output unit 1230 for receiving/sending signal from/to other entities.

Furthermore, the arrangement 1200 includes at least one computer program product 1220 in the form of a non-volatile or volatile memory, e.g., an Electrically Erasable Programmable Read-Only Memory (EEPROM), a flash memory and a hard drive. The computer program product 1220 includes a computer program 1240. The computer program 1240 includes: code/computer readable instructions, which when executed by the processor 1210 in the arrangement 1200 causes the arrangement 1200 and/or the radio access network node 900 in which it is included to perform the actions, e.g., of the procedure described earlier in conjunction with FIG. 2; or code/computer readable instructions, which when executed by the processor 1210 in the arrangement 1200 causes the arrangement 1200 and/or the intermediate network node 1000 in which it is included to perform the actions, e.g., of the procedure described earlier in conjunction with FIG. 5; or code/computer readable instructions, which when executed by the processor 1210 in the arrangement 1200 causes the arrangement 1200 and/or the core network node 1100 in which it is included to perform the actions, e.g., of the procedure described earlier in conjunction with FIG. 8.

The computer program product 1240 may be configured as a computer program code structured in computer program modules 1240A-1240C, 1240D-1240I or 1240J-1240L.

Hence, in an exemplifying embodiment when the arrangement 1200 is used in the radio access network node 900, the code in the computer program of the arrangement 1200 includes a forwarding module 1240A for forwarding to a core network node an attach request originated from a User Equipment (UE). The code in the computer program of the arrangement 1200 further includes a receiving module 1240B for receiving from the core network node a response message indicating that the UE is a backhaul UE. The response message containing an attach response destined to the UE. The code in the computer program of the arrangement 1200 further includes a routing module 1240C for routing, upon receiving an Internet Protocol (IP) packet from the UE, the IP packet based on a destination IP address of the IP packet.

In another exemplifying embodiment when the arrangement 1200 is used in the intermediate network node 1000, the code in the computer program of the arrangement 1200 includes a forwarding module 1240D for forwarding to a core network node an attach request originated from a User Equipment (UE). The code in the computer program of the arrangement 1200 further includes a receiving module 1240E for receiving from the core network node a response message indicating that the UE is a backhaul UE. The response message contains an attach response destined to the UE. The code in the computer program of the arrangement 1200 further includes a modifying module 1240F for modifying the response message by setting a gateway (GW) Internet Protocol (IP) address in the response message to an IP address of the intermediate network node and transmitting the modified response message to the radio access network node. The code in the computer program of the arrangement 1200 further includes a decapsulating module 1240G for decapsulating, upon receiving a GPRS Tunnel Protocol (GTP) packet from the radio access network node, the GTP packet to obtain an IP packet contained in the GTP packet. The code in the computer program of the arrangement 1200 further includes a determining module 1240H for determining that the IP packet is originated from the UE. The code in the computer program of the arrangement 1200 further includes a routing module 1240I for routing the IP packet based on a destination IP address of the IP packet.

In another exemplifying embodiment when the arrangement 1200 is used in the core network node 1100, the code in the computer program of the arrangement 1200 includes a receiving module 1240J for receiving an attach request from another network node. The attach request being originated from a User Equipment (UE) and contains an identifier associated with the UE. The code in the computer program of the arrangement 1200 further includes a determining module 1240K for determining that the UE is a backhaul UE based on the identifier. The code in the computer program of the arrangement 1200 further includes a transmitting module 1240L for transmitting a response message to the other network node. The response message contains an attach response destined to the UE. The response message contains a predetermined gateway IP address for indicating to the other network node that the UE is a backhaul UE.

The computer program modules could essentially perform the actions of the flow illustrated in FIG. 2, to emulate the arrangement 920 in the radio access network node 900, or the actions of the flow illustrated in FIG. 5, to emulate the arrangement 1020 in the intermediate network node 1000, or the actions of the flow illustrated in FIG. 8, to emulate the arrangement 1120 in the core network node 1100. In other words, when the different computer program modules are executed in the processor 1210, they may correspond, e.g., to the units 921-923 of FIG. 9, or to the units 1021-1026 of FIG. 10, or to the unit 1121-1123 of FIG. 11.

Although the code means in the embodiments disclosed above in conjunction with FIG. 12 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units.

For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a radio access network node for routing backhaul packets, comprising:
   forwarding to a core network node an attach request originated from a User Equipment (UE);
   receiving from the core network node a response message indicating that the UE is a backhaul UE, the response message comprising:
   an attach response destined to the UE; and
   a predetermined gateway Internet Protocol (IP) address for a reserved IP address that only notifies the radio access network node that the UE is the backhaul UE such that the response message indicates that the UE is the backhaul UE; and
   routing, upon receiving an IP packet from the UE, the IP packet based on a destination IP address of the IP packet.

2. The method of claim 1, wherein the attach request contains an identifier associated with the UE and the response message is generated based on the identifier.

3. The method of claim 1, wherein the radio access network node is an evolved NodeB (eNB) and the core network node is a Mobility Management Entity (MME).

4. A radio access network node comprising a transceiver, a processor and a memory, said memory containing instructions executable by said processor whereby said radio access network node is operative to:
   forward to a core network node an attach request originated from a User Equipment (UE);
   receive from the core network node a response message indicating that the UE is a backhaul UE, the response message containing:
   an attach response destined to the UE; and
   a predetermined gateway Internet Protocol (IP) address for a reserved IP address that only notifies the radio access network node that the UE is the backhaul UE such that the response message indicates that the UE is the backhaul UE; and
   route, upon receiving an IP packet from the UE, the IP packet based on a destination IP address of the IP packet.

5. A method in an intermediate network node for routing backhaul packets, the intermediate network node being located between a radio access network node and a core network, the method comprising:
   forwarding to a core network node an attach request originated from a User Equipment (UE);
   receiving from the core network node a response message indicating that the UE is a backhaul UE, the response message comprising:
   an attach response destined to the UE; and
   a predetermined gateway Internet Protocol (IP) address for a reserved IP address that only notifies the radio access network node that the UE is the backhaul UE such that the response message indicates that the UE is the backhaul UE;
   modifying the response message by setting a gateway (GW) IP address in the response message to an IP address of the intermediate network node and transmitting the modified response message to the radio access network node;
   decapsulating, upon receiving a General Packet Radio Service (GPRS) Tunnel Protocol (GTP) packet from the radio access network node, the GTP packet to obtain an IP packet contained in the GTP packet;
   determining that the IP packet is originated from the UE; and
   routing the IP packet based on a destination IP address of the IP packet.

6. The method of claim 5, wherein the attach request contains an identifier associated with the UE and the response message is generated based on the identifier.

7. The method of claim 5, wherein said determining comprises:
   obtaining an S1 Application Protocol (S1AP) identifier associated with the UE from the response message received from the core network node;
   allocating a GTP Tunnel Identifier (TEID) for the S1AP identifier; and
   determining that the IP packet is originated from the UE when a GTP TEID contained in the GTP packet matches the allocated GTP TEID.

8. The method of claim 5, wherein the radio access network node is an evolved NodeB (eNB) and the core network node is a Mobility Management Entity (MME).

9. An intermediate network node located between a radio access network node and a core network, comprising a transceiver, a processor and a memory, said memory containing instructions executable by said processor whereby said intermediate network node is operative to:
   forward to a core network node an attach request originated from a User Equipment (UE);
   receive from the core network node a response message indicating that the UE is a backhaul UE, the response message containing:
   an attach response destined to the UE; and
   a predetermined gateway Internet Protocol (IP) address for a reserved IP address that only notifies the radio access network node that the UE is the backhaul UE such that the response message indicates that the UE is the backhaul UE; and
   modify the response message by setting a gateway (GW) IP address in the response message to an IP address of the intermediate network node and transmit the modified response message to the radio access network node;
   decapsulate, upon receiving a General Packet Radio Service (GPRS) Tunnel Protocol (GTP) packet from the radio access network node, the GTP packet to obtain an IP packet contained in the GTP packet;
   determine that the IP packet is originated from the UE; and route the IP packet based on a destination IP address of the IP packet.

10. The method of claim 9, wherein the core network node is a Mobility Management Entity (MME) and the other network node is an evolved NodeB (eNB) or an intermediate network node between an eNB and its associated core network.

* * * * *